A. BURROWS.
RUNNERS AND PROPELLING MECHANISM FOR AUTOMOBILE TRUCKS.
APPLICATION FILED JAN. 27, 1917.
1,252,233.
Patented Jan. 1, 1918.
3 SHEETS—SHEET 1.
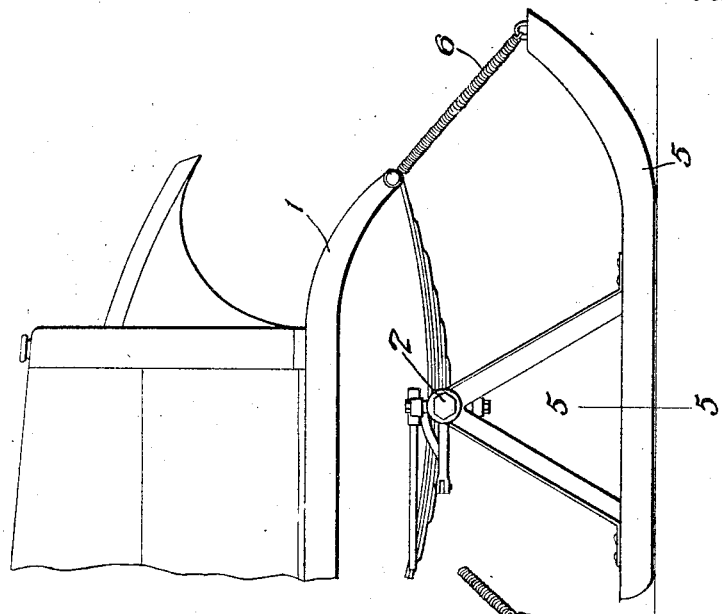
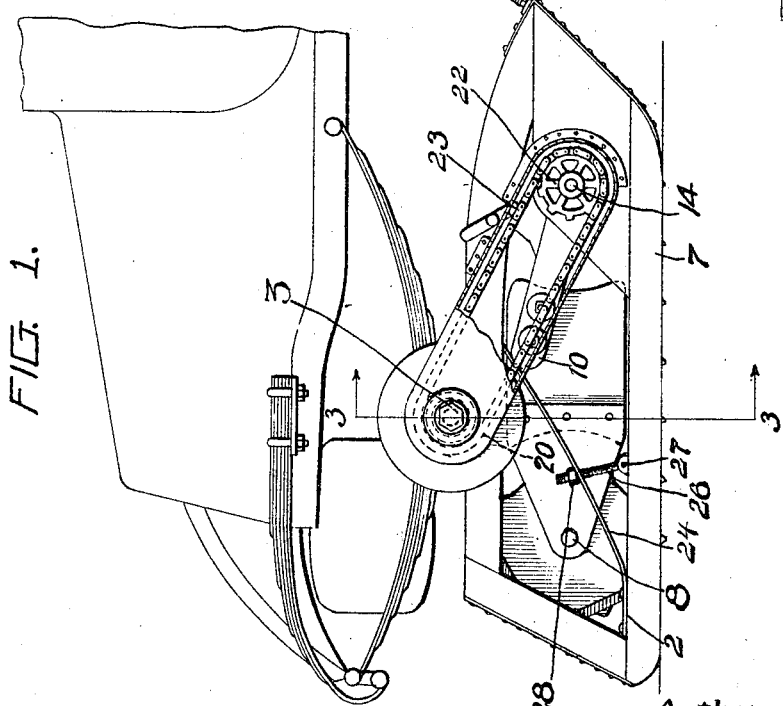
Witness
Inventor
Arthur Burrows
By
Attorney

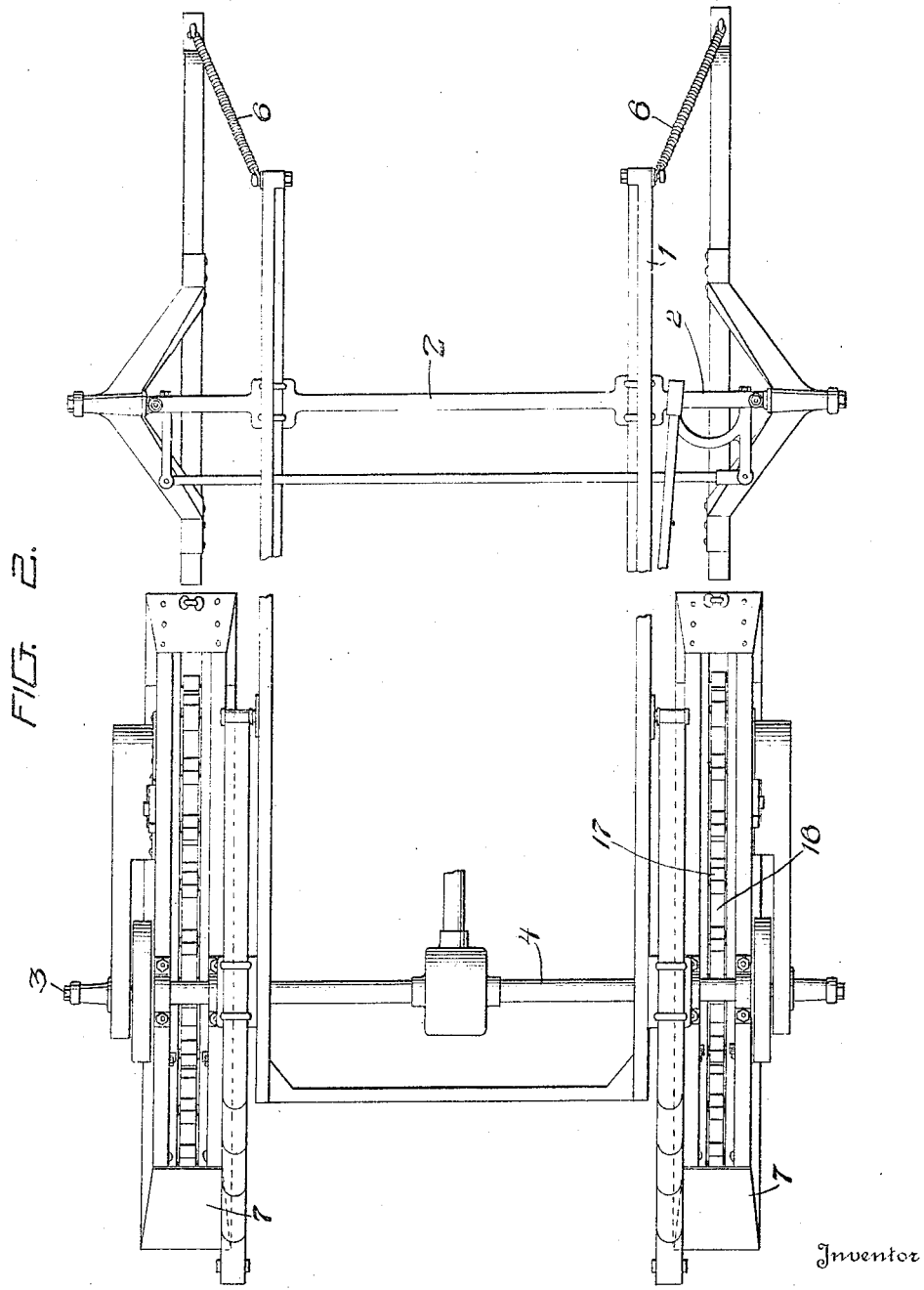

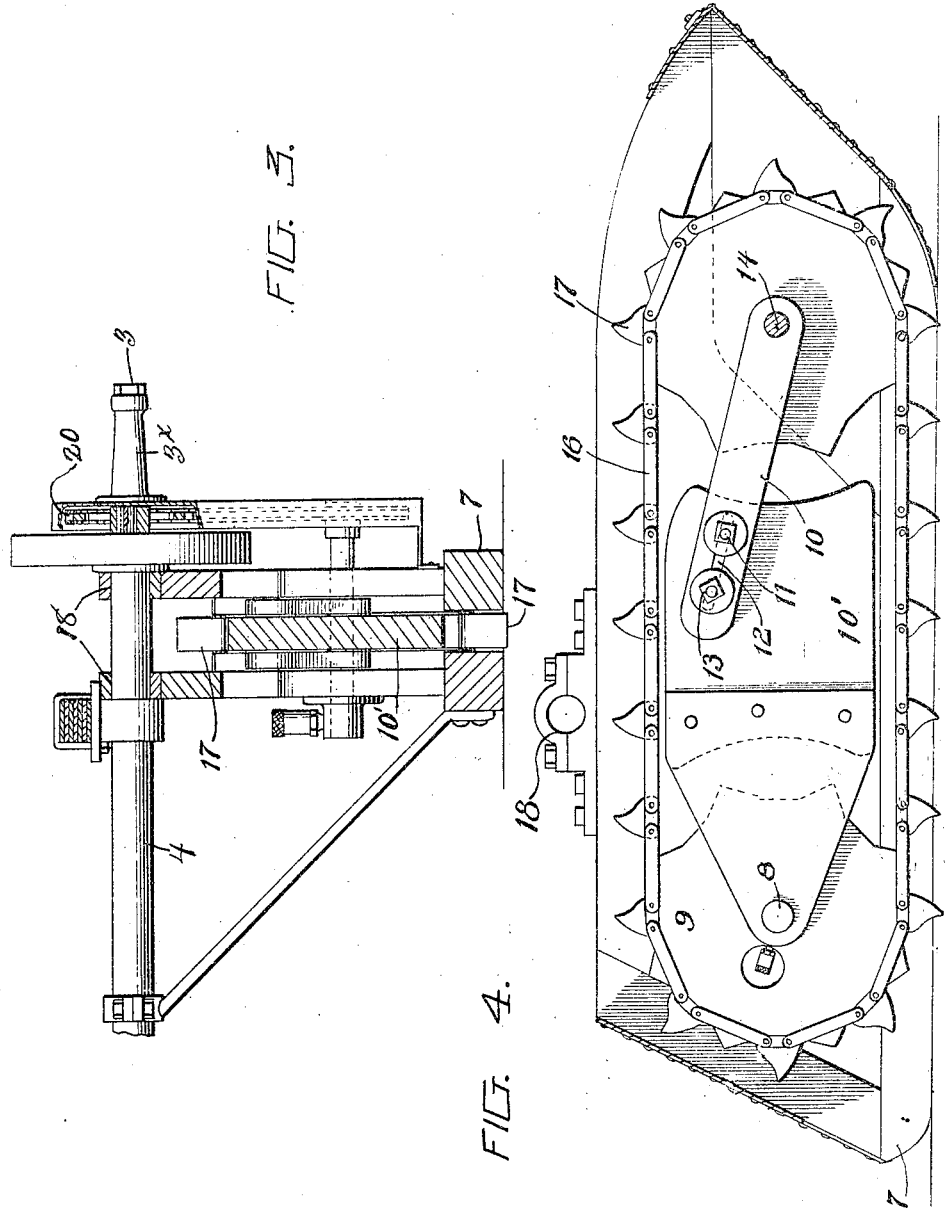

UNITED STATES PATENT OFFICE.

ARTHUR BURROWS, OF FREEDOM, NEW YORK.

RUNNERS AND PROPELLING MECHANISM FOR AUTOMOBILE-TRUCKS.

1,252,233.  Specification of Letters Patent.  Patented Jan. 1, 1918.

Application filed January 27, 1917. Serial No. 144,954.

*To all whom it may concern:*

Be it known that I, ARTHUR BURROWS, a citizen of the United States, residing at Freedom, in the county of Cattaraugus and State of New York, have invented certain new and useful Improvements in Runners and Propelling Mechanism for Automobile-Trucks; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for attachment to automobile trucks for converting the same for use as sleighs and comprises a simple and efficient device of this nature having various details of construction, combinations and arrangements of parts which will be hereinafter fully described, shown in the accompanying drawings and then specifically defined in the appended claims.

My invention is illustrated in the accompanying drawings, in which:—

Figure 1 is a side elevation showing the invention applied to the truck of an automobile, the wheels being removed.

Fig. 2 is a top plan view.

Fig. 3 is a sectional view on line 3—3 of Fig. 1.

Fig. 4 is a central vertical sectional view through one of the rear runners and driving mechanism, and Fig. 5 is a sectional view on line 5—5 of Fig. 1.

Reference now being had to the details of the drawings by numerals, 1 designates the frame of an automobile having a forward axle 2 and a rear axle 3 mounted within the casing 4. To the forward axle are connected the runners 5, taking the place on the skein of the axle occupied by the forward wheels of the automobile. To the forward end of each runner is connected a coiled spring 6 which in turn is connected to the frame 1.

To the rear axles are attached the runners 7, one of which is shown in section in Fig. 4 of the drawings, and comprises a casing with an opening in the bottom and in the walls of which is journaled the shaft 14 upon which pivotal bars 10 are journaled, having slots 12. A plate 10' carries bolts 11 passing through the slots 12 in the bars 10, and nuts 13 are mounted upon said bolts and adapted to hold the bars 10 in different adjusted positions relatively to the plate 10'. A shaft 8 is mounted in said plate 10' and has journaled thereon a sprocket wheel 9. A similar sprocket wheel is journaled upon the shaft 14, and a sprocket chain 16 passes about the two sprocket wheels, said sprocket chains being made up of links having spurs 17 intermediate the links and adapted to bite into the ice or snow upon which the runner is to travel. The rear runners 7 have bearing boxes 18, in which the driving axle 3 is mounted, and 20 is a sprocket wheel adapted to take the place of the automobile wheel which has been removed from the axle. A stub shaft 14 carried by the bars 10 has keyed thereto a sprocket wheel 22, about which, and the sprocket wheel 20, a chain 23 passes and forms means whereby the sprocket chain 16 may be driven. A suitable sleeve 3ˣ fits over the projecting end of the axle upon which the sprocket wheel 20 is mounted.

In order to regulate the tension of the spurs upon the ice or snow, springs 24 are fastened at their lower ends to the runners and their forward ends bear yieldingly against the rear ends of the bars 10. Screws 26 are pivotally connected at 27 to the runner and pass through apertures in the springs, and nuts 28 are mounted upon the screws 26 and bear against the springs 24 and afford means for regulating the tension of said springs.

In operation, when the truck of an automobile is equipped with my propelling apparatus and runners, the same power may be applied to the driving of the endless chain, causing the spurs to bite into the snow or ice, the degree of pressure that the teeth may have upon the surface of snow or ice being regulated by the tension of the springs. The weight of the forward portion of the truck will come upon the front runners, while the weight of the rear portion will be thrown upon the runner portion at the lower end of the frame carrying the propelling mechanism.

What I claim to be new is:—

1. Runner and propelling apparatus for automobiles comprising runners adapted to be attached to the rear axle, each runner comprising a casing, shafts journaled in the walls of the casing, a sprocket wheel fixed to the shaft, bars journaled upon the latter, a plate having adjustable connections with said bars, a shaft carried by said plate and a sprocket wheel carried by the shaft mounted upon the plate, sprocket chain connections between the sprocket wheels, spurs upon the sprocket chain movable through said slot, means connected to the rear axle for driving the shaft which is journaled in said casing, screws fastened to the rear runners, springs fastened to the latter and bearing against the ends of said bars, and nuts upon the screws adapted to bear against said springs.

2. Runners and propelling apparatus for automobiles, comprising rear runners, a driving shaft journaled near the forward end of each runner, a sprocket wheel rotating with said shaft, yielding bars pivotally mounted upon said shaft, recessed plates secured to said bars, and a stub shaft journaled in the walls of the recess, a sprocket wheel journaled on said stub shaft, an endless sprocket chain passing about said sprocket wheels, as set forth.

3. Runners and propelling apparatus for automobiles, comprising rear driving runners, a driving shaft journaled in suitable bearings upon said runners, a sprocket wheel rotating with said driving shaft, bars pivotally mounted upon said shaft, a plate secured to said bars and having a recessed end, a stub shaft journaled in the walls of the recessed end, a sprocket wheel journaled on the stub shaft, a spur sprocket chain passing about said sprocket wheels, springs secured to the runner, and adjustable means for holding the same yieldingly against said bars.

In testimony whereof I hereunto affix my signature in presence of two witnesses.

ARTHUR BUK_

Witnesses:
    JOHN W. ELLIS,
    T. J. BRISBANE.